United States Patent Office 2,920,810
Patented Jan. 12, 1960

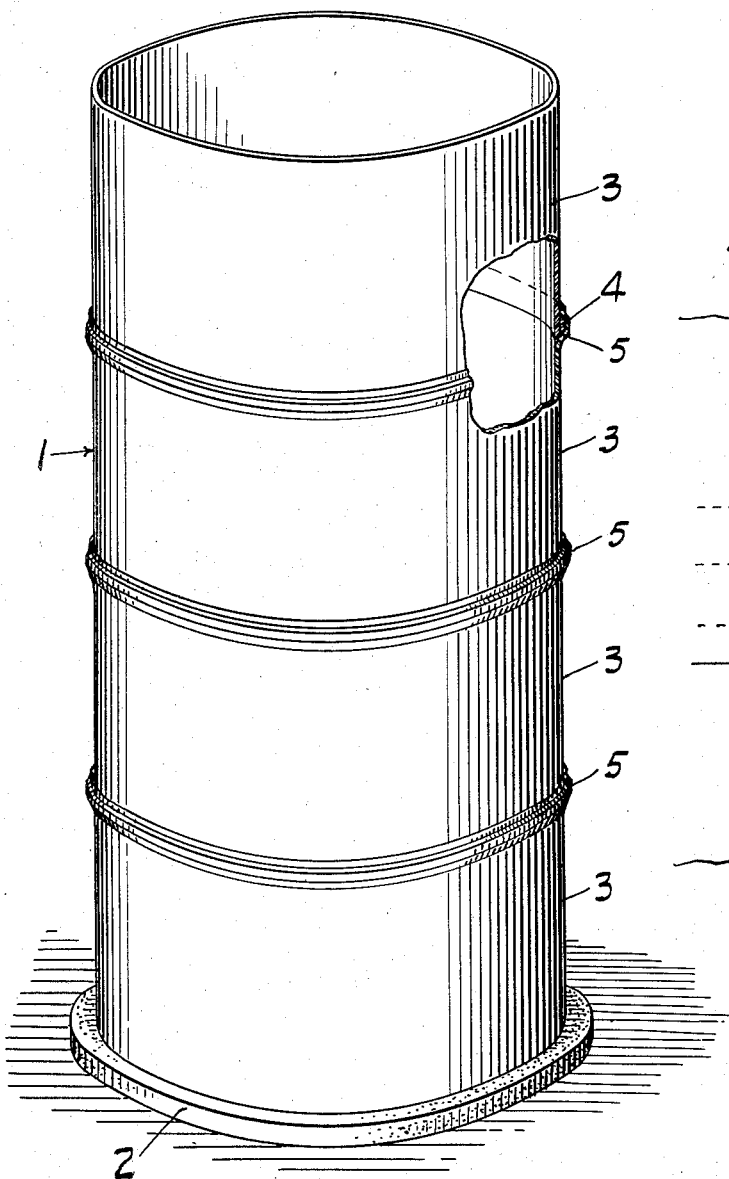
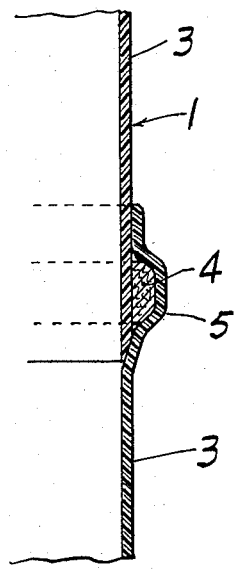

2,920,810

REINFORCED PLASTIC STORAGE STRUCTURE

Erwin G. Dueringer, Arcadia, Calif., assignor to A. O. Smith Corporation, Milwaukee, Wis., a corporation of New York Application March 14, 1955, Serial No. 493,859

4 Claims. (Cl. 229—67)

This invention relates to a storage structure and more particularly to a circumferentially reinforced storage structure formed of a fiber reinforced plastic material.

It has been proposed in the past to fabricate a storage structure by winding strands of long reinforcing fibers in a helical pattern about a mandrel or other internal support. The fibers are impregnated with a thermosetting resin and on curing of the resin the fibers are bonded together to form an integral structure.

To reinforce the fiber reinforced resin structure against internal pressures metal ribs or the like have been secured to the outer surfaces of the structure. However, metal ribs not only require auxiliary attachments such as bolts or the like, but, as the modulus of elasticity and the coefficients of thermal expansion of the metal and reinforced resin are considerably different, the metal ribs tend to restrict expansion and contraction of the resin during service with the result that undesirable stresses are set up in the resin which causes cracking or crazing of the same.

The present invention is directed to a circumferential reinforcement for a storage structure formed of a series of vertically superimposed cylindrical sections with the lower edge portion of each section overlapping and being bonded to the upper edge portion of the adjacent lower section.

Each section is frabricated by winding long reinforcing fibers impregnated with a thermosetting resin about an internal support in a generally helical pattern. According to the present invention, a non-structural ring made of a lightweight low strength material is disposed circumferentially around the outer surface of each completed section adjacent the lower edge thereof. With this ring attached to the completed section a strand of fiber reinforcement is then wound on the mandrel to form a second section of the storage structure with the reinforcement being wound over the ring and bonded to the original section on either side of the ring to completely enclose the ring.

The second section, by overlapping the ring and enclosing the same, defines a circumferential corrugation and this corrugation adds circumferential strength to the storage structure.

The present invention provides a lightweight and inexpensive means of circumferentially stiffening a fiber reinforced resin structure. As the ring itself is lightweight and has a low compressive and tensile strength, it will add no measurable strength to the vessel, but instead serves as a form so that the overlapping fibers will be shaped to add circumferential strength to the structure. With this construction the ring or form can be crushed by internal pressures within the vessel so that expansion and contraction of the reinforced resin is not restricted and undesirable stresses are not set up in the resin.

The drawings illustrate the best mode presently contemplated of carrying out the invention.

In the drawings:

Figure 1 is a perspective view of the completed storage structure; and

Fig. 2 is a fragmentary enlarged vertical section taken through a joint between sections of the structure.

The drawings illustrate a fiber reinforced plastic storage structure 1 which rests on a foundation 2. The storage structure 1 is formed of a series of vertically superimposed cylindrical sections 3 which are secured together at their adjacent edges to form the structure 1.

Each of the sections 3 is fabricated by winding strands of long reinforcing fibers about an internal support or mandrel in a generally helical pattern. The strands are suitably impregnated with a liquid, uncured, thermosetting resin and on curing of the resin the fibers are bonded together to form an integral section.

To provide circumferential reinforcement for the structure 1 a non-structural ring, strip or band 4 made of a lightweight low strength material is disposed circumferentially around the outer surface of each section 3 adjacent the lower edge thereof. The ring 4 is generally made of an organic material such as paper, cellular cellulose acetate, or the like, and the cross section of the ring 4 should be such that the side edges are generally beveled or curved in order that subsequent windings of fiber strands can be readily wrapped over the ring and tapered into the previously completed section 3.

The fibrous windings of the next lower section 3 in the series overlap the ring 4 and are bonded to the upper section on either side of the ring 4. The upper edge portion of the second or lower section, by conforming to the shape of ring 4, defines a circumferential corrugation, indicated by 5. The corrugation 5 serves to provide circumferential strength for the storage structure 1.

As seen in Figure 1 a ring 4 is disposed about the lower edge portion of each of the sections 3 and the upper edge portion of each succeeding lower section then overlaps the ring 4 to provide a series of vertically spaced corrugations 5.

To fabricate the storage structure 1, the uppermost of the cylindrical sections 3 is formed by winding a fibrous strand impregnated with a thermosetting resin on a generally cylindrical mandrel.

After curing of the resin, a ring 4 is secured to the lower edge portion of the completed section 3 by tape, adhesive or the like.

The next lower section 3 is then formed by winding the fibrous strand on the mandrel with the strand being wound over the ring 4 to completely enclose the same. On curing of the resin, the second of the sections is securely bonded to the uppermost section on either side of the ring 4.

This procedure is then repeated to add any desired number of sections to the previously completed sections with a ring 4 being located adjacent the lower edge of each section to provide the stiffening corrugations 5.

The ring 4 is lightweight and has a low compressive and tensile strength so that it in itself does not add strength to the structure. The ring 4 merely serves as a form which shapes the overlapping layer of fiber reinforcement so that the reinforcement is formed into a circumferential corrugation. This corrugation is the stiffening or reinforcing member for the structure.

Due to internal pressures of the contained material structure 1 or due to temperature variations, the sections 3 tend to expand and contract to a small degree. The rings 4 being of a low strength material will not restrict this deformation of the sections and thus, no undesirable stresses will be set up in the resin of the sections.

While the above description is directed to the use of the non-structural material in the form of a ring 4, it is contemplated that the material may be disposed axially or helically on the section 3 to provide increased stiffness in any desired direction.

Various modes of carrying out the invention are contemplated as being within the scope of the following claims particularly pointing out and distinctly claiming the subject matter which is regarded as the invention.

I claim:

1. A storage structure comprising a generally cylindrical layer of a fiber reinforced resin material, a strip of a lightweight flexible low strength material disposed on the outer surface of said layer, a second layer of a fiber reinforced resin material disposed over said strip in contact with the outer surface of said first named layer on either side of said strip, and means for bonding said second layer to the first layer to form an integral structure with increased stiffness provided by the portion of the second layer overlapping said strip.

2. A storage structure comprising a generally cylindrical section, a band of lightweight cellular organic material circumferentially disposed around the outer surface of said section and spaced from an end thereof, a second generally cylindrical section formed of long reinforcing fibers disposed in a generally circumferential pattern with said fibers being disposed over said band in contact with the outer surface of said first named section on either side of said band, and a bonding material to bond the contacting portions of the sections together to form an integral structure.

3. A storage structure comprising a series of generally cylindrical axially aligned sections with the adjacent end portions of the sections disposed in lapping relation, each of said sections formed of generally long reinforcing fibers disposed in a helical pattern with said fibers being bonded together by a cured thermosetting resin, and a ring of cellular cellulose acetate disposed between the lapping end portions of the sections with the reinforcing fibers of the outer of said lapping end portions disposed over said ring at an angle thereto and enclosing said ring to form a circumferential ridge, and a bonding material to bond the lapping portions of the section together on either side of said ring.

4. A storage structure comprising a generally cylindrical section, a solid band of lightweight flexible cellular material circumferentially disposed around the outer surface of said section and spaced from an end thereof, said band having a substantially flat base surface disposed in contiguous relation with said section and having generally tapered side surfaces extending outwardly from said base surface, a second generally cylindrical section formed of long reinforcing fibers disposed in a generally circumferential pattern with said fibers disposed over said band in contact with the outer surface of said first named section on either side of said band, and a bonding material to bond the contacting portions of the sections together to form an integral structure.

References Cited in the file of this patent

UNITED STATES PATENTS

| | | |
|---|---|---|
| 1,129,017 | Rivers | Feb. 16, 1915 |
| 1,215,970 | Naylor et al. | Feb. 13, 1917 |
| 1,376,216 | Mittinger | Apr. 26, 1921 |
| 1,545,036 | Culhane, Jr., et al. | July 7, 1925 |
| 1,716,215 | Dunlap | June 4, 1929 |
| 1,826,193 | West | Oct. 6, 1931 |
| 1,857,519 | Spry | May 10, 1932 |
| 1,954,610 | Bebie | Apr. 10, 1934 |
| 2,511,481 | Schneider | June 13, 1950 |